(12) United States Patent
Yoshida

(10) Patent No.: US 9,067,815 B2
(45) Date of Patent: Jun. 30, 2015

(54) POROUS GLASS BASE MATERIAL SINTERING METHOD

(71) Applicant: Shin-Etsu Chemical Co., Ltd., Tokyo (JP)

(72) Inventor: Makoto Yoshida, Ibaraki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 353 days.

(21) Appl. No.: 13/760,069

(22) Filed: Feb. 6, 2013

(65) Prior Publication Data

US 2013/0205834 A1 Aug. 15, 2013

(30) Foreign Application Priority Data

Feb. 9, 2012 (JP) ................... 2012-026156

(51) Int. Cl.
*C03B 37/10* (2006.01)
*C03B 37/07* (2006.01)
*C03B 37/012* (2006.01)
*C03B 37/014* (2006.01)

(52) U.S. Cl.
CPC ....... *C03B 37/0126* (2013.01); *C03B 37/01446* (2013.01); *C03B 37/0146* (2013.01); *C03B 37/01486* (2013.01)

(58) Field of Classification Search
CPC ............... C03B 37/0126; C03B 37/01446; C03B 37/0146; C03B 37/01486; C03B 37/01853

USPC ................. 65/416, 427, 377, 384, 484, 488
See application file for complete search history.

(56) References Cited

U.S. PATENT DOCUMENTS

| 4,204,851 | A | * | 5/1980 | Nolan | 65/421 |
| 4,726,764 | A | * | 2/1988 | Yoshikai | 432/24 |
| 5,133,796 | A | * | 7/1992 | Tsuchiya et al. | 65/144 |
| 5,203,899 | A | * | 4/1993 | Kyoto et al. | 65/398 |
| 5,364,428 | A | * | 11/1994 | Kyoto et al. | 65/397 |
| 6,442,978 | B1 | * | 9/2002 | Kamio et al. | 65/488 |
| 8,516,855 | B2 | * | 8/2013 | Fogliani et al. | 65/377 |
| 2002/0081377 | A1 | * | 6/2002 | Ohishi et al. | 427/163.2 |
| 2004/0237595 | A1 | * | 12/2004 | Fogliani et al. | 65/421 |
| 2008/0011019 | A1 | * | 1/2008 | Hayami et al. | 65/377 |
| 2013/0000840 | A1 | * | 1/2013 | Dawes et al. | 156/294 |
| 2014/0174133 | A1 | * | 6/2014 | Billings et al. | 65/397 |

* cited by examiner

*Primary Examiner* — Jason L Lazorcik

(57) ABSTRACT

It is an objective of the present invention to provide a method for sintering a porous glass base material that can experience an earthquake or large vibration without the base material falling or decreasing in quality when performing sintering, dehydration, and transparent vitrification on the porous glass base material. Provided is a method of sintering a porous glass base material including sintering by lowering the porous glass base material vertically through a furnace from above while rotating the porous glass base material, the method comprising changing rotational speed of the porous glass base material during the sintering.

7 Claims, 4 Drawing Sheets

| FURNACE | | A | B | C | D | E | F | G |
|---|---|---|---|---|---|---|---|---|
| NUMBER OF REVOLUTIONS | rpm | 1 | 3 | 5 | 7 | 9 | 11 | 13 |
| NUMBER OF SINTERINGS | NUMBER | 50 | 50 | 50 | 50 | 50 | 50 | 50 |
| NUMBER OF FALLS | NUMBER | 0 | 0 | 0 | 1 | 2 | 3 | 4 |
| FALL RATE | % | 0.0 | 0.0 | 0.0 | 2.0 | 4.0 | 6.0 | 8.0 |
| AVERAGE OF THE MAXIMUM ECCENTRICITY RATIO | % | 0.31 | 0.28 | 0.23 | 0.11 | 0.10 | 0.10 | 0.10 |

FIG.4

| FURNACE | | H |
|---|---|---|
| NUMBER OF ROTATIONS (NEAR THE START OF SINTERING) | rpm | 3 |
| NUMBER OF ROTATIONS (NEAR THE END OF SINTERING) | rpm | 7 |
| NUMBER OF SINTERINGS | NUMBER | 50 |
| NUMBER OF FALLS | NUMBER | 0 |
| FALL RATE | % | 0.0 |
| AVERAGE OF THE MAXIMUM ECCENTRICITY RATIO | % | 0.1 |

FIG.5

POROUS GLASS BASE MATERIAL SINTERING METHOD

The contents of the following Japanese patent application are incorporated herein by reference: NO.2012-026156 filed on Feb. 9, 2012.

BACKGROUND

1. Technical Field

The present invention relates to a method of sintering a porous glass base material that includes performing sintering, dehydration, and transparent vitrification on the porous glass base material that will be the raw material for an optical fiber.

2. Related Art

A porous glass base material that serves as the raw material for an optical fiber is manufactured by using vapor axial deposition (VAD) or outside vapor deposition (OVD) to deposit glass fine particles on a starting member. The porous glass base material is hung from the top of a long shaft formed by jointed members made of $Si_3N_4$, for example, and inserted into a furnace tube that includes an environment of an inert gas and a gas for a dehydration reaction. The porous glass base material is then lowered vertically from above while being rotated and passed through a heated region to undergo the sintering, dehydration, and transparent vitrification processes, thereby obtaining an optical fiber preform formed by a core and cladding. After elongating this preform to have a prescribed diameter, the preform is drawn by a drawing mechanism to obtain the optical fiber.

During this sintering process performed while the porous glass base material is hung from the tip of a long jointed shaft, if an earthquake or large vibration (referred to hereinafter simply as an earthquake) occurs, the shaft and base material swing around violently and this load causes damage to weak portions such as the joints of the shaft or the portion where the shaft connects to the base material, thereby making it easy for the base material to fall. When the base material falls, not only does the base material become unusable, but it also damages the furnace tube and the sintering apparatus.

Particularly in recent years, the size of porous glass base materials has increased rapidly in an attempt to decrease costs, and this greatly increases the risk of falling. In order to prevent such falling due to earthquakes, methods have been proposed for providing a seismic isolator to prevent shaking, but this proposal significantly increases the equipment cost and creates space problems when providing this seismic isolator in existing equipment.

It is an objective of the present invention to provide a method for sintering a porous glass base material that solves the above problems without decreasing the quality when performing sintering, dehydration, and transparent vitrification on the porous glass base material.

SUMMARY

Provided is a method of sintering a porous glass base material including sintering by lowering the porous glass base material vertically through a furnace from above while rotating the porous glass base material, the method comprising changing rotational speed of the porous glass base material during the sintering. The rotational speed is preferably changed in a stepped manner or continuously according to a lowered position of the base material.

With the present invention, advantageous effect are achieved that include preventing a decrease in quality, preventing the porous glass base material from falling, and restricting core eccentricity when performing sintering, dehydration, and transparent vitrification on the porous glass base material.

BRIEF DESCRIPTION OF THE DRAWINGS

FIG. 4 is a chart showing the results obtained when sintering and changing the rotational speed.

FIG. 5 is a chart showing the eccentricity and number of falls when sintering was performed and the rotational speed was changed.

DESCRIPTION OF EXEMPLARY EMBODIMENTS

Figure 1:
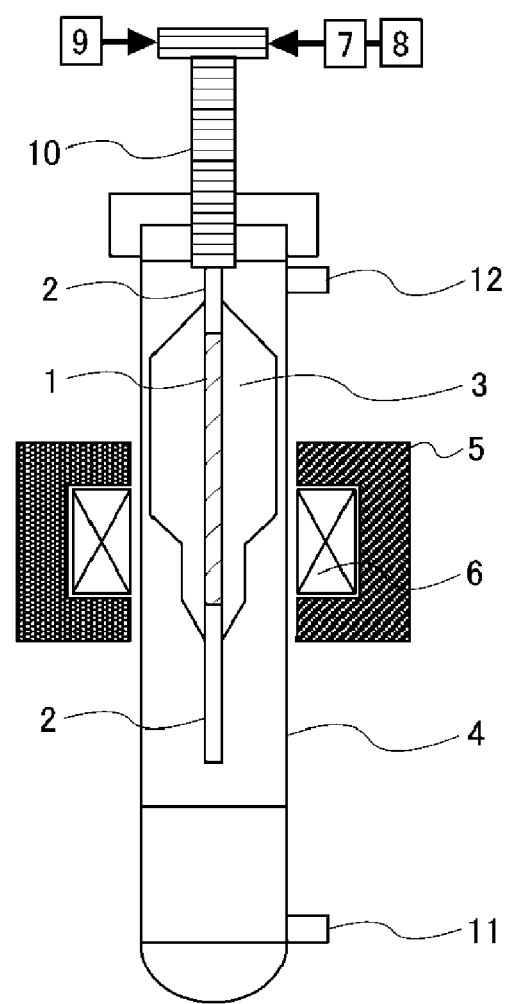
FIG. 1 is a schematic vertical cross-sectional view of an exemplary optical fiber base material sintering apparatus.

FIG. 1 is a schematic vertical cross-sectional view of an exemplary optical fiber base material sintering apparatus. A porous glass base material 3 is connected to a shaft 10 via a dummy member 2, which is connected to a core rod 1, and the porous glass base material 3 hangs down in a furnace. The porous glass base material 3 is lowered vertically while being rotated by a rotating mechanism 9 and the lowering speed is controlled by a speed control apparatus 8 via a driving source 7, and is sintered. The inside of the furnace tube 4 is heated by a heater 6 that is covered by a thermal insulator 5. Furthermore, helium gas, which is an inert gas, and silicon gas, which is a gas for achieving the dehydration reaction, are supplied into the furnace tube 4 from a gas injecting section 11, and are expelled from an exhaust outlet 12.

The sintering of the porous glass base material is realized in the manner described below. Silicon gas and helium gas are injected through a gas injection tube 11 from respective supply sources (not shown). The silicon gas and helium gas are mixed together and injected into the furnace tube 4, thereby filling the furnace tube 4. The porous glass base material 3 is lowered at a low speed, which is controlled by the speed control apparatus 8 via the driving source 7, while being rotated axially by the rotating mechanism 9. By passing the porous glass base material 3 through the region heated by the heater 6 while lowering the porous glass base material 3 at a low speed, the processes of sintering, dehydration, and transparent vitrification are achieved. The porous glass base material 3 used in the following embodiments is formed by depositing glass fine particles using outside vapor deposition.

When an earthquake occurs during the sintering of the porous glass base material 3, the force applied by the earthquake causes the shaft and the base material to be skewed from the center of the rotational axis. When the rotational speed at this time is greater, the force of the rotation in a tangential direction is greater, and therefore the combined force of the rotational force and the force applied by the earthquake is also large, which results in a large amount of shaking of the shaft and base material. As a result, regions with low strength, such as a joint of the shaft or a portion where the shaft connects to the base material, are broken and the base material falls. In order to decrease the shaking of the shaft and base material caused by an earthquake, it is understood that it is effective to perform sintering while decreasing the tangential force caused by the rotation, i.e. while reducing the rotational speed, such that the combined force of the rotational force and the shaking caused by the earthquake is small even when force is added by the earthquake.

However, when sintering is performed with a low rotational speed, the porous glass base material 3 is vitrified with uneven thickness, and this causes eccentricity in the central region of the core. This core eccentricity occurs because of the temperature distribution in an angular direction within the furnace becoming large within the cross-sectional area of the base material due to the spreading of soot that is present in large amounts or localized deterioration of the thermal insulator 5, thereby causing the vitrification to proceed in a direction from the regions with higher temperatures. When the rotational speed is lowered in this manner, there is a quality problem due to the increase in the core eccentricity.

Figure 2:
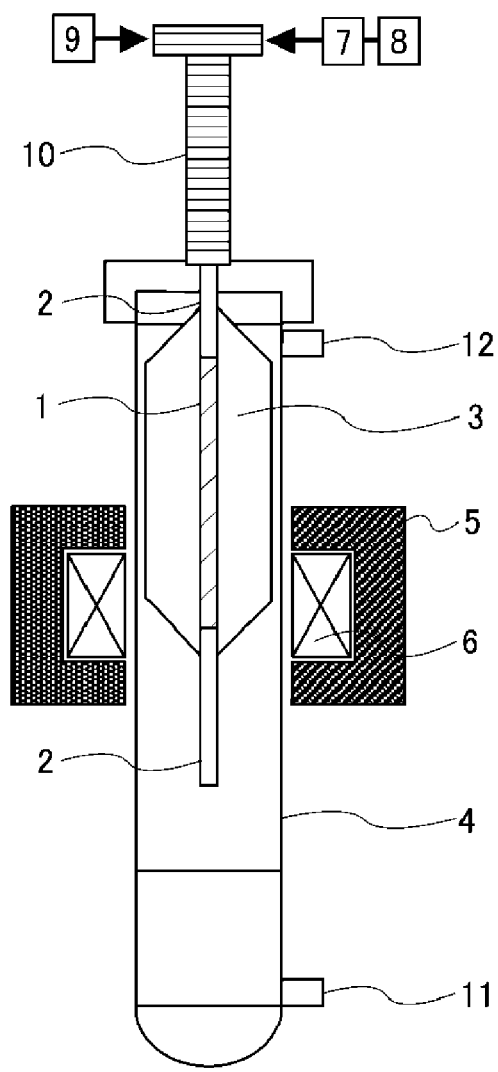
FIG. 2 is a schematic cross-sectional view of the sintering apparatus when sintering begins.
Figure 3:
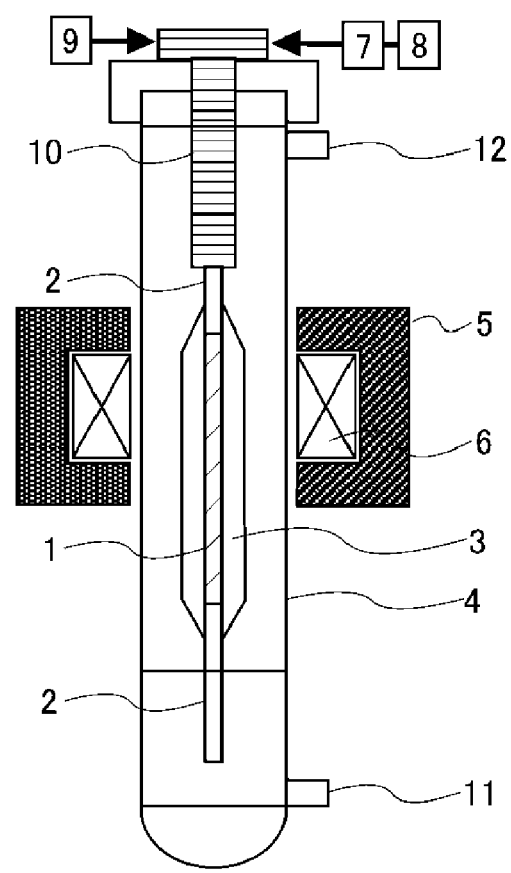
FIG. 3 is a schematic cross-sectional view of the sintering apparatus when sintering ends.

This eccentricity problem is more significant in the latter half of sintering as shown in FIG. 3, during which time the top portion of the porous glass base material 3 that is not yet sintered is gone and the furnace tube 4 is in an open state, than in the earlier half of sintering as shown in FIG. 2, during which time the top portion of the porous glass base material 3 is not yet sintered and acts as a lid of the furnace tube 4. This is because even when the thermal insulator 5 has localized deterioration, the unsintered porous glass base material 3 at a position facing the deteriorated thermal insulator 5 can serve as the thermal insulator, thereby restricting the temperature distribution in the angular direction in the furnace.

Therefore, in the present invention, the rotational speed of the porous glass base material 3 during sintering is changed. For example, sintering is begun with a low rotational speed, and the rotational speed gradually increases as the sintering progresses. As a result, the time of the sintering during which the rotational speed is high, i.e. the time during which the porous glass base material can easily fall, is shortened, and the core eccentricity that mostly occurs during the latter half of the sintering can also be restricted. In this case, with $r_1$ representing the rotational speed at the start of sintering and $r_2$ representing the rotational speed at the end of the sintering, the rotational speed can be increased according to the lowered position of the porous glass base material 3 such that $r_1$ is less than $r_2$. For a porous glass base material 3 obtained by depositing 150 kg of glass fine particles on the outside of a starting member formed by connecting a dummy member 2 to a core rod 1, the rotational speed is preferably set to be 5 rpm or less at the beginning portion of the sintering and 7 rpm or more at the ending portion of the sintering.

As another example of changing the rotational speed during sintering of the porous glass base material 3, the rotational speed of the porous glass base material 3 may be faster at the time when sintering is begun. In this case, with $r_3$ representing the rotational speed at the start of the sintering, $r_4$ representing the rotational speed during sinter, and $r_5$ representing the rotational speed at the end of sintering, the rotational speed may be changed according to the lowered position of the porous glass base material 3 such that $r_3$ is greater than $r_4$ and $r_5$ is greater than $r_4$. In this way, even if a temperature distribution occurs in the furnace tube 4 when the sintering begins, core eccentricity can be restricted.

The rotational speed may be changed gradually or in a stepped manner, according to the lowered position of the base material. By changing the rotational speed in a stepped manner, the speed control of the sintering apparatus 20 can be simplified and a simpler configuration can be used for the speed control mechanism. By changing the rotational speed continuously, the effect of the rotational speed change on the optical fiber preform can be decreased. The rotational speed change of the porous glass base material 3 is not limited to the changes described in the present embodiment. For example, changes of increasing and then decreasing the rotational speed may be performed repeatedly. Furthermore, the acceleration used when increasing or decreasing the rotational speed may be changed.

(Preliminary Testing)

A porous glass base material 3 was prepared by depositing 150 kg of fine glass particles on the outside of a starting member formed by connecting dummy members 2 to the ends of a core rod 1 having an outer diameter of 50 mm and a length of 2000 mm. Seven sintering apparatuses 20 A to G were used to each sinter 50 porous glass base materials 3 over a two-month period. During this two-month period, two earthquakes of 25 Gal or more were experienced, eight earthquakes of 8 to 25 Gal were experienced, and 49 earthquakes of less than 8 Gal were experienced.

FIG. 4 is a chart showing the results obtained when sintering and changing the rotational speed. The rotational speed of the base material was set between 1 and 13 rpm for each sintering apparatus 20, as shown in FIG. 4, and rotational speed was not changed during sintering. As values indicating the eccentricity of the sintered optical fiber preforms, the eccentricity is calculated by dividing the skew between the center axis of the core and the center of the optical fiber preform by the diameter of the optical fiber preform. The maximum eccentricity for each optical fiber preform and the average value of each set of 50 rods were obtained, and these values are shown together in FIG. 4.

As shown in FIG. 4, it is understood that a lower rotational speed results in a lower number of falls, and falls caused by earthquakes can be prevented with a rotational speed of 5 rpm or less. However, when the rotational speed is less than 5 rpm, a tendency was seen for the maximum eccentricity to increase.

(Embodiment)

A porous glass base material 3 identical to those used in the preliminary testing was prepared, sintering was performed with a rotational speed of 5 rpm from the start of sintering until 80% of the total lowering distance was reached, and then sintering was performed with a rotational speed of 7 rpm until the end of the sintering. This sintering was performed for 50 porous glass base materials 3 over a two-month period. During this two-month period, two earthquakes of 25 Gal or more were experienced, seven earthquakes of 8 to 25 Gal were experienced, and 45 earthquakes of less than 8 Gal were experienced.

FIG. 5 is a chart showing the eccentricity and number of falls when sintering was performed and the rotational speed was changed. As made clear from FIG. 5, there were no falls during earthquakes and the maximum eccentricity was kept low.

What is claimed is:

1. A method of sintering a porous glass base material including sintering by lowering the porous glass base material vertically through a furnace from above while rotating the porous glass base material, the method comprising:
    changing rotational speed of the porous glass base material during the sintering.

2. The method of sintering a porous glass base material according to claim 1, wherein
    the rotational speed is increased at least as the sintering of the porous glass base material progresses.

3. The method of sintering a porous glass base material according to claim 2, wherein
    with $r_1$ representing the rotational speed at a start of sintering and $r_2$ representing the rotational speed at an end of the sintering, the rotational speed is increased according to a lowered position of the porous glass base material such that $r_1$ is less than $r_2$.

4. The method of sintering a porous glass base material according to claim 3, wherein
the rotational speed $r_1$ is less than or equal to 5 rpm, and the rotational speed $r_2$ is greater than or equal to 7 rpm.

5. The method of sintering a porous glass base material according to claim 2, wherein
with $r_3$ representing the rotational speed at a start of the sintering, $r_4$ representing the rotational speed during sinter, and $r_5$ representing the rotational speed at an end of sintering, the rotational speed may be changed according to a lowered position of the porous glass base material such that $r_3$ is greater than $r_4$ and $r_5$ is greater than $r_4$.

6. The method of sintering a porous glass base material according to claim 1, wherein
the rotational speed is changed in a stepped manner according to a lowered position of the porous glass base material.

7. The method of sintering a porous glass base material according to claim 1, wherein
the rotational speed is changed in a continuous manner according to a lowered position of the porous glass base material.

* * * * *